US008494697B2

(12) United States Patent
Ballou et al.

(10) Patent No.: US 8,494,697 B2
(45) Date of Patent: Jul. 23, 2013

(54) METHODS AND SYSTEMS FOR PREDICTING WATER VESSEL MOTION (75) Inventors: Philip J. Ballou, Alameda, CA (US); Henry Chen, San Francisco, CA (US)

(73) Assignee: The Boeing Company, Chicago, IL (US)

(*) Notice: Subject to any disclaimer, the term of this patent is extended or adjusted under 35 U.S.C. 154(b) by 1 day.

(21) Appl. No.: 13/073,675

(22) Filed: Mar. 28, 2011

(65) Prior Publication Data
US 2012/0253566 A1 Oct. 4, 2012

(51) Int. Cl.
*G01D 21/00* (2006.01)

(52) U.S. Cl.
USPC ... 701/21; 702/2; 702/3; 702/150; 73/170.01; 73/170.02; 73/170.04; 73/170.31

(58) Field of Classification Search
USPC .................. 701/21; 702/2, 3, 150; 73/170.01, 73/170.02, 170.04, 170.31, 181
See application file for complete search history.

(56) References Cited

U.S. PATENT DOCUMENTS

| 3,110,178 | A | * | 11/1963 | Marks et al. | 73/170.05 |
| 3,397,574 | A | * | 8/1968 | Soulant | 73/170.01 |
| 3,408,864 | A | * | 11/1968 | Josephson | 73/170.31 |
| 3,765,236 | A | * | 10/1973 | Erdely | 73/170.01 |
| 3,769,838 | A | * | 11/1973 | Buckler | 73/170.31 |
| 3,899,668 | A | * | 8/1975 | Tucker, Jr. | 702/55 |
| 4,000,646 | A | * | 1/1977 | Mott et al. | 73/170.31 |
| 4,135,394 | A | * | 1/1979 | Middleton et al. | 73/170.31 |
| 4,158,306 | A | * | 6/1979 | Brainard, II | 73/170.01 |
| 4,184,368 | A | * | 1/1980 | Frosch et al. | 73/170.31 |
| 4,220,044 | A | * | 9/1980 | LeBlanc et al. | 73/170.01 |
| 4,408,488 | A | * | 10/1983 | Marshall | 73/170.29 |
| 4,515,013 | A | * | 5/1985 | Hue | 73/170.01 |
| 4,986,121 | A | * | 1/1991 | Luscombe | 73/170.29 |

(Continued)

FOREIGN PATENT DOCUMENTS

WO 2008031880 A2 3/2008

OTHER PUBLICATIONS

J. Vesecky, K. Laws, S. Petersen, C. Bazeghi and D. Wiberg, "Prototype Autonomous Mini-buoy for use in a Wireless Networked, Ocean Surface Sensor Array," In Proc. The International Geoscience and Remote Sensing Symposium '07, 2007, pp. 4987-4990.*

(Continued)

*Primary Examiner* — Thomas Black
*Assistant Examiner* — Peter D Nolan
(74) *Attorney, Agent, or Firm* — Armstrong Teasdale LLP (57) ABSTRACT A ship motion prediction system is described that includes a plurality of surface platforms and a central computer having a communications interface. The platforms each include a propulsion system for movement of the platform, a plurality of sensors operable for gathering sensor data relating to an environment proximate the platform, a processing device communicatively coupled to the propulsion system and the plurality of sensors, and a transceiver communicatively coupled to the processing device. The central computer includes a communications interface, and the processing device is programmed to transmit sensor data to the central computer via the transceiver and the communications interface. The central computer is programmed to transmit commands for operation of the propulsion system to the processing device via the communications interface and transceiver. The central computer is further programmed to predict an effect of the environments associated with the plurality of surface platforms on a water vessel or vessels operating within a vicinity of the plurality of surface platforms.

19 Claims, 5 Drawing Sheets

U.S. PATENT DOCUMENTS

| | | | | |
|---|---|---|---|---|
| 5,209,112 | A | * | 5/1993 | McCoy et al. .............. 73/170.01 |
| 5,528,493 | A | * | 6/1996 | Potter ............................... 702/3 |
| 5,577,942 | A | | 11/1996 | Juselis |
| 7,371,136 | B2 | | 5/2008 | Hine et al. |
| 8,019,546 | B1 | * | 9/2011 | Osburn, III ....................... 702/3 |
| 2008/0052002 | A1 | * | 2/2008 | Paiva et al. ........................ 702/2 |

OTHER PUBLICATIONS

M. Earle, K. Steele and H. Yuan-Huang, "Wave Spectra Corrections for Measurements of Hull-Fixed Accelerometers," In Proc. Oceans 1984, 1984, pp. 725-730.*

C. Teng, L. Bernard, B. Taft and M. Burdette, "A Compact Wave and Ocean Data Buoy System," In. Proc. MTS/IEEE Oceans 2005, 2005, pp. 1249-1254.*

AXYS Technologies, Inc.; "6 Metre Nomad Buoy;" www.axystechnologies.com; 4 pages.

Curcio, J. et al.; Self-Positioning Smart Buoys, the "Un-Buoy" Solution: Logistic Considerations using Autonomous Surface Craft Technology and Improved Communications Infrastructure; 5 pages.

Dept. of the Navy Science & Technology; Environment and Ship Motioning Forecasting (ESMF); ONR BAA Announcement #10-019; 31 pages.

International Search Report, Application No. 12161854.0-1803/2506235, dated May 3, 2013, pp. 12.

Environmental and Ship Motion Forecasting (ESMF), Department of the Navy Science & Technology, dated Nov. 15, 2010, pp. 32.

Vesecky et al., Prototype Autonomous Mini-buoy for use in a Wireless Networked, Ocean Surface Sensor Array, Electrical Engineering Department, University of California at Santa Cruz, dated 2007, pp. 4.

Earle et al., Wave Spectra Corrections for Measurements with Hull-Fixed Accelerometers, Marine Environments Corporation, dated 1984, pp. 6.

Wang et al., Design of an Autonomous Surface Vehicle Used for Marine Environment Monitoring, Marine Technology & Control Engineering Key Laboratory Shanghai Maritime University, dated 2008, pp. 6.

* cited by examiner

METHODS AND SYSTEMS FOR PREDICTING WATER VESSEL MOTION

BACKGROUND

The field of the disclosure relates generally to motion of ships in bodies of water, and more specifically, to methods and apparatus for predicting ship motion.

Ship motions are affected by local waves, currents, and wind in combination with the ship's speed, direction, loading, weight distribution, hull shape, and other parameters. In order to predict ship motion, it is necessary to know in advance what the wave motions, current, wind, and other environmental conditions are in the vicinity of the ship. Since waves, current, and wind travel at various speeds and directions, and the ship itself may also be under way, it is desirable to monitor these conditions at significant distances away from the ship so that it can be determined in advance if the waves, current, and wind are heading in a direction that will eventually impart one or more motions onto the ship.

Waves and surface currents can be monitored by radar, light detection and ranging (LIDAR) systems, buoys, and satellite imaging systems. Using radar to monitor waves presents a variety of limitations. For example, X-band radar is a short range line-of-sight solution, and is unable to monitor conditions over the horizon. Furthermore, longer range wave activity can be blocked by large closer waves. X-band radar requires a minimum amount of wind-generated surface texture in order to function. High frequency radar can be blurred if the sensor is moving. Slow update rates makes it difficult or impossible to track an individual wave train, and/or determine wave velocity. LIDAR is a line-of-sight optical system and is impaired by cloud cover, fog, and rain. An airborne radar solution or LIDAR could be deployed by UAVs (unmanned airborne vehicles), but such solutions require special platforms and equipment to deploy and recover, as well as being prohibitively expensive to operate.

Traditional buoys need to be moored to the ocean floor to hold station, which is difficult or impossible in deep water, and time consuming even in shallow water, especially if the buoys are to be recovered. Once moored, a buoy cannot be easily moved to a new location. Further, buoys can break loose from their moorings in storms and be lost and/or damaged. Their instrumentation is also subject to degradation and/or vandalism over time.

Satellite imaging systems using visual methods such as cameras or LIDAR are impaired by darkness and cloud cover. Furthermore, satellite payload space and airtime is expensive. Suitable satellite coverage may not be available in some parts of the world.

Wind speed and direction, and rapid changes in temperature, pressure, and humidity are best monitored by local weather instruments, such as anemometers, thermometers, barometers, and hygrometers. These cannot be readily monitored by remote sensors.

BRIEF DESCRIPTION

In one aspect, a ship motion prediction system is provided that includes a plurality of surface platforms and a central computer having a communications interface. The platforms each include a propulsion system for movement of the platform, a plurality of sensors operable for gathering sensor data relating to an environment proximate a platform, a processing device communicatively coupled to the propulsion system and the plurality of sensors, and a transceiver communicatively coupled to the processing device. The central computer includes a communications interface, and the processing device is programmed to transmit the sensor data to the central computer via the transceiver and the communications interface. The central computer is programmed to transmit commands for operation of the propulsion system to the processing device via the communications interface and transceiver. The central computer is further programmed to predict an effect of the environments associated with the plurality of surface platforms on a water vessel operating within a vicinity of the plurality of surface platforms.

In another aspect, a method for predicting ship motion is provided that includes deploying a plurality of surface platforms in the vicinity of the ship, each surface platform including a plurality of sensors operable for gathering sensor data relating to an environment proximate said platform, receiving sensor data from the plurality of surface platforms, and predicting, based on the sensor data, an effect of the environments associated with said plurality of surface platforms on a water vessel operating within the vicinity of the plurality of surface platforms.

In still another aspect, a water environment sensor device is provided that includes a platform operable in an aquatic environment, a propulsion system for movement of the platform within the aquatic environment, a plurality of sensors operable for gathering sensor data relating to conditions of the aquatic environment proximate the platform, a transceiver, and, a processing device communicatively coupled to the plurality of sensors and the transceiver, the processing device programmed to receive data from the plurality of sensors and transmit the sensor data to an external device via the transceiver.

The features, functions, and advantages that have been discussed can be achieved independently in various embodiments or may be combined in yet other embodiments further details of which can be seen with reference to the following description and drawings.

DETAILED DESCRIPTION

The described embodiments are directed to methods and systems for predicting ship motion. Specifically, an apparatus and a process of measuring wave motion (i.e., height, period, direction, and speed) are described for the purpose of predicting the motions of one or more ships while conducting launch, recovery, loading, or unloading operations. As further described, application of the described embodiments may occur in the open ocean, in coastal waters, or in inland waters, in water of any depth, and while the ship or ships are stationary or under way.

Figure 1:
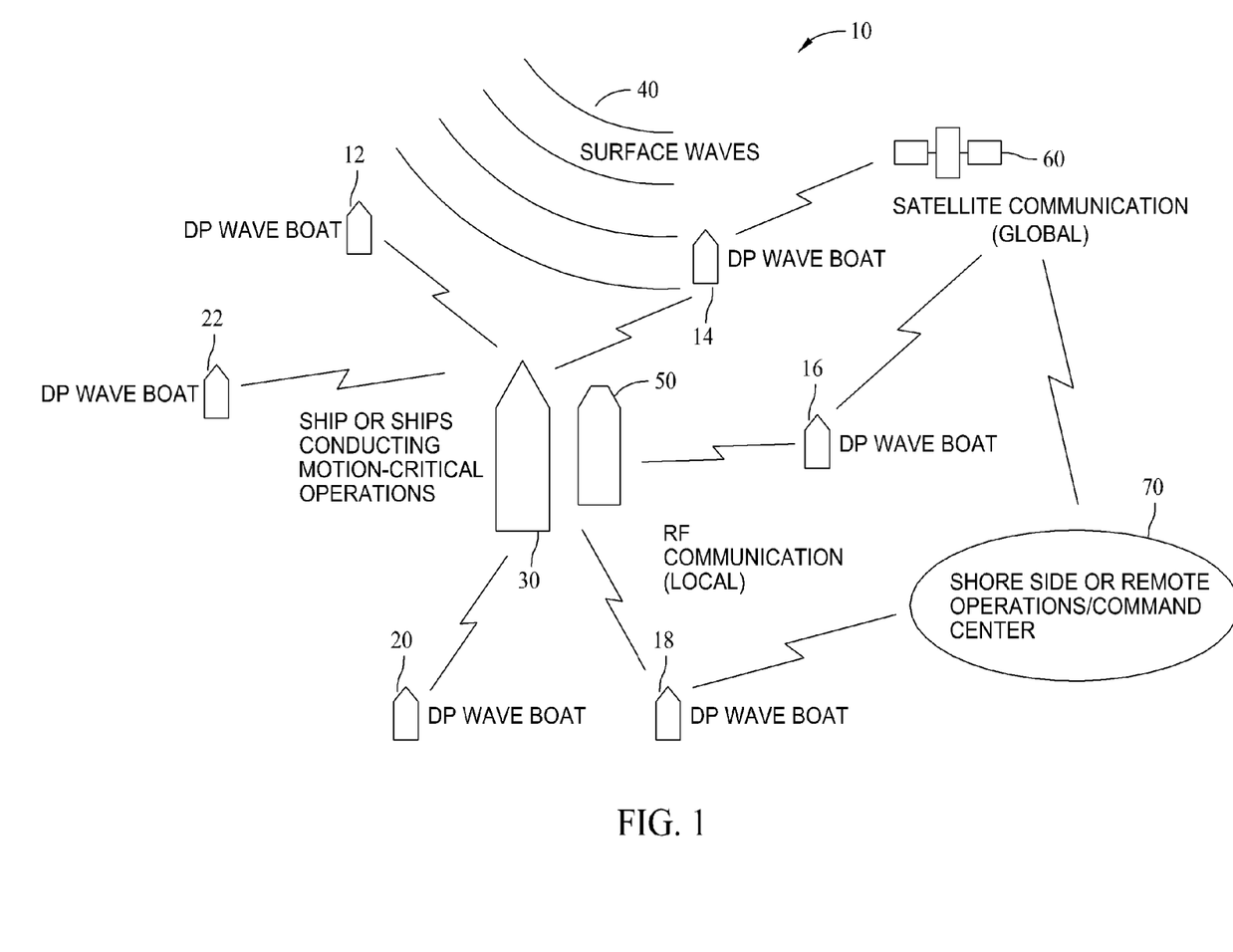
FIG. 1 is an illustration of a ship motion prediction system illustrating a plurality of mobile surface platforms.

FIG. 1 is an illustration of a ship motion prediction system 10 which includes a plurality of mobile surface platforms 12, 14, 16, 18, 20, and 22. Mobile surface platforms 12, 14, 16, 18, 20, and 22 are sometimes referred to as wave monitoring devices or "wave boats". In various embodiments, and as further explained herein, mobile surface platforms 12, 14, 16, 18, 20, and 22 are programmed to operate autonomously, can be remotely controlled, or even be manned vessels.

In practice, platforms 12, 14, 16, 18, 20, and 22 are easily deployed, for example, from a ship 30, where they can measure and transmit wave motions and other environmental conditions to the ship 30 for processing to predict what motions the ship 30 will have when the waves reach the ship 30. In one configuration, the remotely operable surface platforms 12, 14, 16, 18, 20, and 22 are each deployed, for example, a number of kilometers from the ship 30. In one embodiment, the mobile surface platforms 12, 14, 16, 18, 20, and 22 deploy themselves and return to the ship autonomously, thereby making deployment and recovery fast and easy. In other embodiments, the mobile surface platforms 12, 14, 16, 18, 20, and 22 are remotely operable. In still other embodiments, the mobile surface platforms 12, 14, 16, 18, 20, and 22 are manned.

As further described herein, predictions associated with oncoming waves 40 and other environmental factors are in the range of seconds to minutes prior to the actual motions caused by the waves 40 and other environmental factors occurring at the ship. The embodiments are particularly useful when launch, recovery, loading, or unloading operations are occurring between a ship 30 and another ship 50 while the two ships are more or less stationary or under way. The mobile surface platforms 12, 14, 16, 18, 20, and 22 include a communications capability, as shown in FIG. 1. In various embodiments, these devices are capable of direct communications with the ship 30, but other embodiments may include a capability to communicate through a satellite 60, which provides a communications link for the surface platforms 12, 14, 16, 18, 20, and 22 to a shore-based or other remote command center 70. As also shown in FIG. 1, surface platforms 12, 14, 16, 18, 20, and 22 may be configured for direct communications with the shore-based or other remote command center 70.

Figure 2:
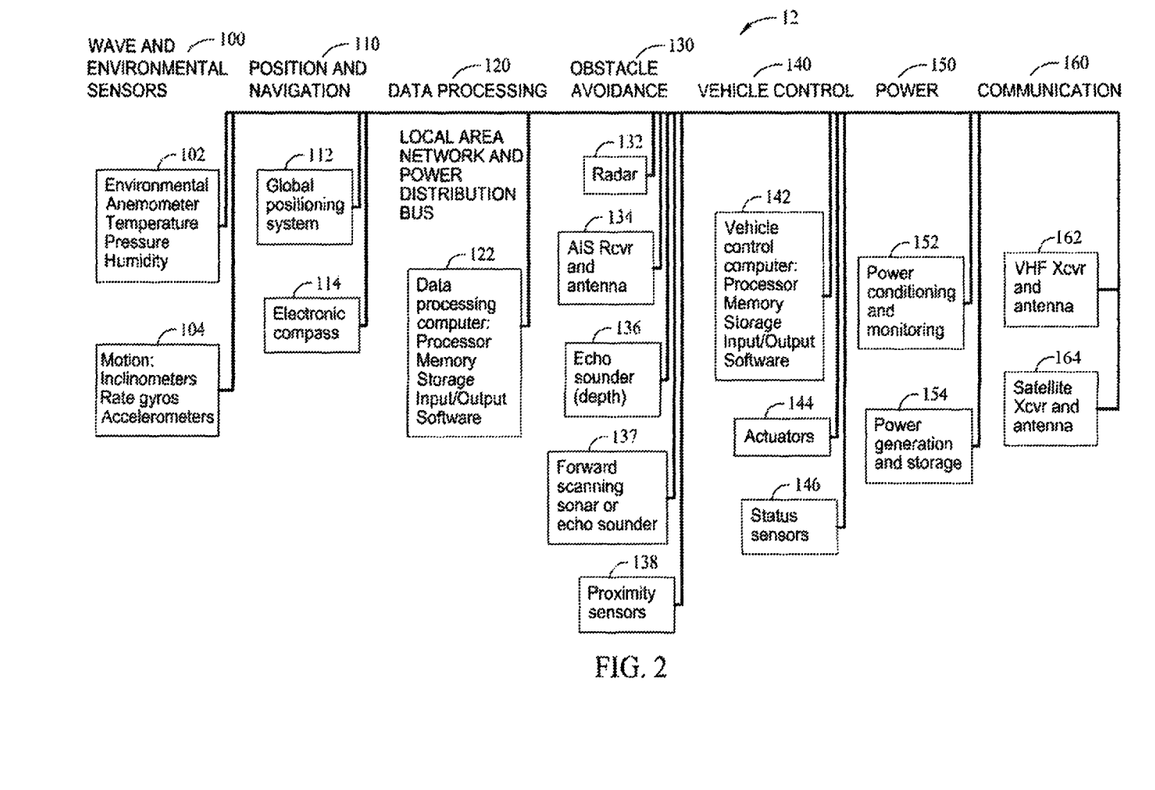
FIG. 2 is a block diagram of one of the mobile surface platforms of FIG. 1.

Various embodiments are contemplated for surface platforms 12, 14, 16, 18, 20, and 22, and one configuration, for example, surface platform 12, is shown in FIG. 2. The physical configuration for surface platforms 12, 14, 16, 18, 20, and 22 may vary, for example and in one embodiment, the platform is relatively small, 2m×3m×1m, with a long gimbaled keel that extends below the platform. In the embodiment, the keel is equipped with ballast weight and a propulsion device. In embodiments, the surface platform contains instrumentation to monitor motion, direction, orientation, position, time, date, and other key factors of its operation as well as the motion of the waves, currents, and other environmental conditions around it.

Referring now to FIG. 2, surface platforms 12, 14, 16, 18, 20, and 22 may includes one or more of wave and environmental sensors, position and navigation sensors, a data processing function, obstacle avoidance sensors, vehicle control sensors and actuators, a power function, and communications. Wave and environmental sensors 100 include environmental sensors 102 that include one or more of anemometers, temperature, pressure and humidity sensors. Motion sensors 104 include one or more of inclinometers, rate gyroscopes, accelerometers, inertial reference units, and other motion sensing devices. Position and navigation 110 refers to one or both of global positioning system 112 and an electronic compass 114. The data processing function 120 is further described below with respect to FIG. 3, but can be generally referred to as a processing device 122.

Obstacle avoidance sensors 130 may include radar 132, AIS (automatic identification system) receiver and antenna 134, an echo sounder 136 to determine water depth, a scanning sonar 137, a video camera, and proximity sensors 138. Vehicle control 140 includes a vehicle control computer 142, actuators 144, and status sensors 146. It should be noted that vehicle control computer 140 and processing device 122 may be the same device, depending on a configuration of the platform 12. Power function 150 includes power conditioning and monitoring 152 as well as power generation and storage 154. Communications 160 includes one or both of a VHF transceiver and antenna 162 and a satellite transceiver and antenna 164.

It should be understood that the above described configuration is exemplary only. A particular platform, e.g., 12, 14, 16, 18, 20, and 22 could incorporate all of the above, a subset of the above, substituted items (such as a non-VHF wireless transceiver) or additional items not listed above, dependent on the particular applications.

In one embodiment, VHF transceiver and antenna 162 are utilized to relay collected sensor data to ship 30, and also to receive commands, such as commands to move to a different location, from the ship 30. In embodiments, power conditioning and monitoring 152 includes onboard electrical power for powering the described instrumentation and maneuvering functions. The platform also may incorporate one or more methods of recharging this electrical power source as illustrated by power generation and storage 154, including one or more of solar, motor driven (alternator), as well as motion and/or wave action generators. Embodiments include a motor and fuel for propulsion and battery recharging.

The various sensor packages described with respect to FIG. 2 are an integral component of the deployment platform in one embodiment, or devices that are deployed only when the platform is stationary. Referring again to the overall operation of system 10, one or more surface platforms 12, 14, 16, 18, 20, and 22 may be deployed from the ship 30 or another small launch vessel. In embodiments, each surface platform 12, 14, 16, 18, 20, and 22 is autonomous, remotely operable by a remote controller, or manned. Regardless of configuration, the individual surface platforms are maneuvered to various predetermined positions and distances from the ship 30. The surface platforms are further programmed or controlled to hold station (position), monitor local wave motions and other environmental conditions, and transmit that information to one or more of the ship 30, satellite 60 and shore-based remote command center 70. As is apparent from the figures and descriptions, more than one surface platform may be deployed in different locations around the ship 30.

The wave motion data and other environmental data are then received aboard the ship, either directly, via the satellite 60 and/or via the shore-based or other remote command center 70. A computer is programmed to then to predict the motions of the ship 30 when the waves reach it. Motion predictions may be calculated for more than one ship, for example, two ships conducting launch, recovery, loading, or unloading operations. The motion prediction computer may be located on a ship 30 as implied in the above sentences; however, embodiments are contemplated where this function can be performed elsewhere. Such a processing function is sometimes referred to herein as a central computer. Embodiments are contemplated where such processing may be preformed at shore-based or other remote command center 70. In other embodiments, one of the surface platforms 12, 14, 16, 18, 20, and 22 may be programmed to receive the sensor data from the other platforms, directly or indirectly, perform the motion calculations, and forward the results to the ship 30. At the end of operations, the ship 30 is able to recall the surface platforms 12, 14, 16, 18, 20, and 22, which may be recovered either by a small launch vessel or the surface platforms 12, 14, 16, 18, 20, and 22 are capable of navigating themselves back to the ship for recovery. As seen in FIG. 1, through the use of a plurality of surface platforms 12, 14, 16, 18, 20, and 22, the motions that can affect ship 30 from one or more of a multitude of directions are accounted for by the deployment of multiple surface platforms 12, 14, 16, 18, 20, and 22.

Alternatively, where extended launch, recovery, loading, or unloading operations are anticipated while one or two ships are underway, the surface platforms 12, 14, 16, 18, 20, and 22 may take a different physical forms, ranging in shape and function from a device similar to small motor powered surface craft such as a small radio controlled boat, to a full-size boat configuration, to an inflatable craft. Examples of viable candidates for mobile surface platforms include the Nomad Buoy, Boston Whaler, Zodiac, Sealver Waveboat, Projector Jet 20, WAM-V, Liquid Robotics Wave Glider, and Wing Products RibSki. No matter the physical configuration, the platform operates autonomously, under remote control, or manned, stopping and/or slowing to take measurements such as those described herein, and then moving from one monitoring position to another as the ship 30 continues along its course. One anticipated embodiments is contemplated to be able to maneuver at speeds ranging between 0-20 knots, as an example.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

Figure 3:
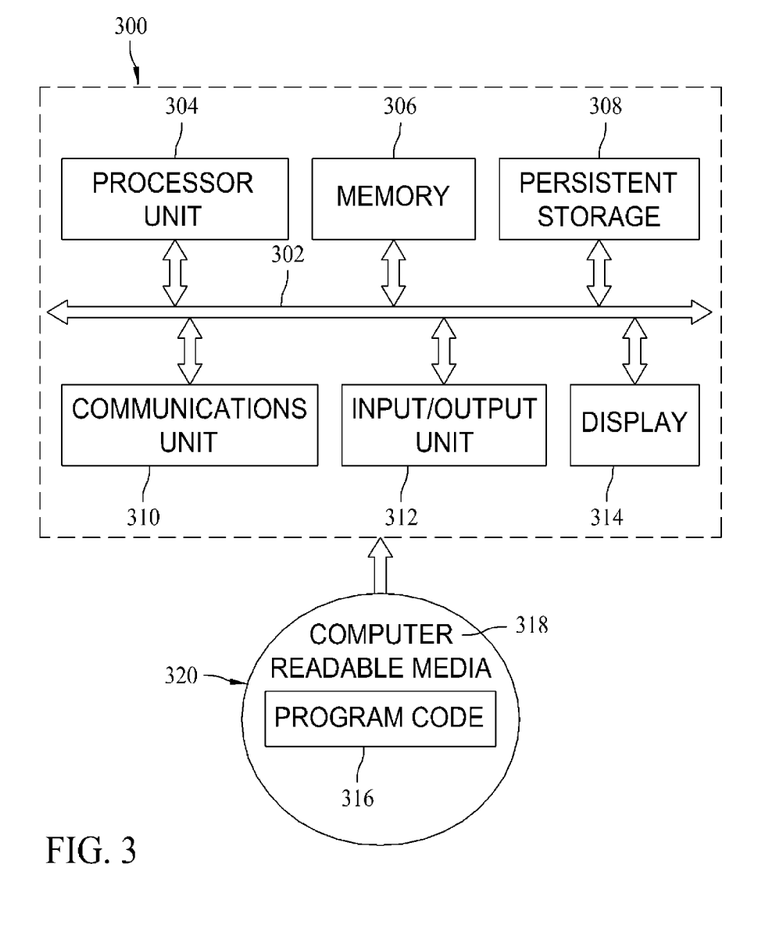
FIG. 3 is a diagram of a data processing system.

Turning now to FIG. 3, a diagram of a data processing system is depicted in accordance with an illustrative embodiment. In this illustrative example, data processing system 300 includes communications fabric 302, which provides communications between processor unit 304, memory 306, persistent storage 308, communications unit 310, input/output (I/O) unit 312, and display 314. Data processing system 300 is representative of data processing function 120 and/or vehicle control computer 142 which as mentioned above, could be one and the same.

Processor unit 304 serves to execute instructions for software that may be loaded into memory 306. Processor unit 304 may be a set of one or more processors or may be a multi-processor core, depending on the particular implementation. Further, processor unit 304 may be implemented using one or more heterogeneous processor systems in which a main processor is present with secondary processors on a single chip. As another illustrative example, processor unit 304 may be a symmetric multi-processor system containing multiple processors of the same type.

Memory 306 and persistent storage 308 are examples of storage devices. A storage device is any piece of hardware that is capable of storing information either on a temporary basis and/or a permanent basis. Memory 306, in these examples, may be, for example, without limitation, a random access memory or any other suitable volatile or non-volatile storage device. Persistent storage 308 may take various forms depending on the particular implementation. For example, without limitation, persistent storage 308 may contain one or more components or devices. For example, persistent storage 308 may be a hard drive, a flash memory, a rewritable optical disk, a rewritable magnetic tape, or some combination of the above. The media used by persistent storage 308 also may be removable. For example, without limitation, a removable hard drive may be used for persistent storage 308.

Communications unit 310, in these examples, provides for communications with other data processing systems or devices. In these examples, communications unit 310 is a network interface card. Communications unit 310 may provide communications through the use of either or both physical and wireless communication links.

Input/output unit 312 allows for input and output of data with other devices that may be connected to data processing system 300. For example, without limitation, input/output unit 312 may provide a connection for user input through a keyboard and mouse. Further, input/output unit 312 may send output to a printer. Display 314 provides a mechanism to display information to a user.

Instructions for the operating system and applications or programs are located on persistent storage 308. These instructions may be loaded into memory 306 for execution by processor unit 304. The processes of the different embodiments may be performed by processor unit 304 using computer implemented instructions, which may be located in a memory, such as memory 306. These instructions are referred to as program code, computer usable program code, or computer readable program code that may be read and executed by a processor in processor unit 304. The program code in the different embodiments may be embodied on different physical or tangible computer readable media, such as memory 306 or persistent storage 308.

Program code 316 is located in a functional form on computer readable media 318 that is selectively removable and may be loaded onto or transferred to data processing system 300 for execution by processor unit 304. Program code 316 and computer readable media 318 form computer program product 320 in these examples. In one example, computer readable media 318 may be in a tangible form, such as, for example, an optical or magnetic disc that is inserted or placed into a drive or other device that is part of persistent storage 308 for transfer onto a storage device, such as a hard drive that is part of persistent storage 308. In a tangible form, computer readable media 318 also may take the form of a persistent storage, such as a hard drive, a thumb drive, or a flash memory that is connected to data processing system 300. The tangible form of computer readable media 318 is also referred to as computer recordable storage media. In some instances, computer readable media 318 may not be removable.

Alternatively, program code 316 may be transferred to data processing system 300 from computer readable media 318 through a communications link to communications unit 310 and/or through a connection to input/output unit 312. The communications link and/or the connection may be physical or wireless in the illustrative examples. The computer readable media also may take the form of non-tangible media, such as communications links or wireless transmissions containing the program code.

In some illustrative embodiments, program code 316 may be downloaded over a network to persistent storage 308 from another device or data processing system for use within data processing system 300. For instance, program code stored in a computer readable storage medium in a server data processing system may be downloaded over a network from the server to data processing system 300. The data processing system providing program code 316 may be a server computer, a client computer, or some other device capable of storing and transmitting program code 316.

The different components illustrated for data processing system 300 are not meant to provide architectural limitations to the manner in which different embodiments may be implemented. The different illustrative embodiments may be implemented in a data processing system including components in addition to or in place of those illustrated for data processing system 300. Other components shown in FIG. 3 can be varied from the illustrative examples shown.

As one example, a storage device in data processing system 300 is any hardware apparatus that may store data. Memory 306, persistent storage 308 and computer readable media 318 are examples of storage devices in a tangible form.

In another example, a bus system may be used to implement communications fabric 302 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, without limitation, memory 306 or a cache such as that found in an interface and memory controller hub that may be present in communications fabric 302.

Figure 4:
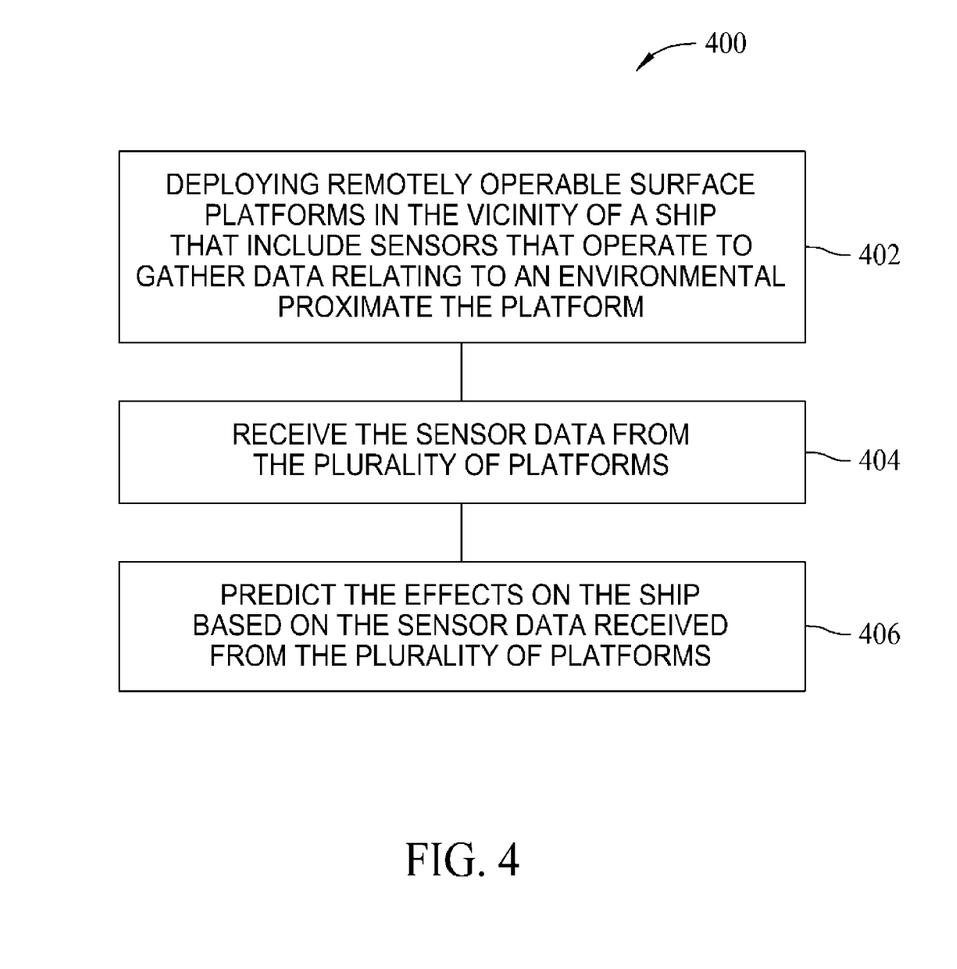
FIG. 4 is a flowchart illustrating a process for predicting the motion of a ship.

As mentioned above, the above described system is operable for predicting effects of the environments associated with the dispersed plurality of surface platforms on a water vessel operating within the vicinity of the plurality of surface platforms. FIG. 4 is a flowchart 400 illustrating one possible method for predicting ship motion using the above described system. The method includes deploying 402 a plurality of mobile surface platforms in the vicinity of the ship, each surface platform including a plurality of sensors operable for gathering sensor data relating to an environment proximate said platform and receiving 404 sensor data from the plurality of remotely operable surface platforms. Examples of sensor data include, but are not limited to, wave height, wave direction, platform orientation s, platform accelerations, platform rotations, platform position, time and date. To provide such sensor data, one or more of an inclinometer, a rate gyroscope, an accelerometer, a global positioning system, an electronic compass may be deployed on each surface platform.

Based on the sensor data, an effect of the environments associated with said plurality of surface platforms on a water vessel operating within a vicinity of said plurality of surface platforms is predicted 406. In embodiments, a model associated with a hull configuration for an individual surface platform is utilized to adjust received sensor data associated with the individual surface platform, the model based on an interaction between the hull configuration and the environment. In addition, the surface platforms may be remotely controlled, autonomous, or manned. For example, the process could include deploying a plurality of autonomously operable surface platforms each programmed to move to a specific location at which point they gather sensor data. Alternatively, the process could include deploying a plurality of remotely operable surface platforms and operating those platforms remotely such that they each move to a specific location for the gathering of sensor data.

Figure 5:
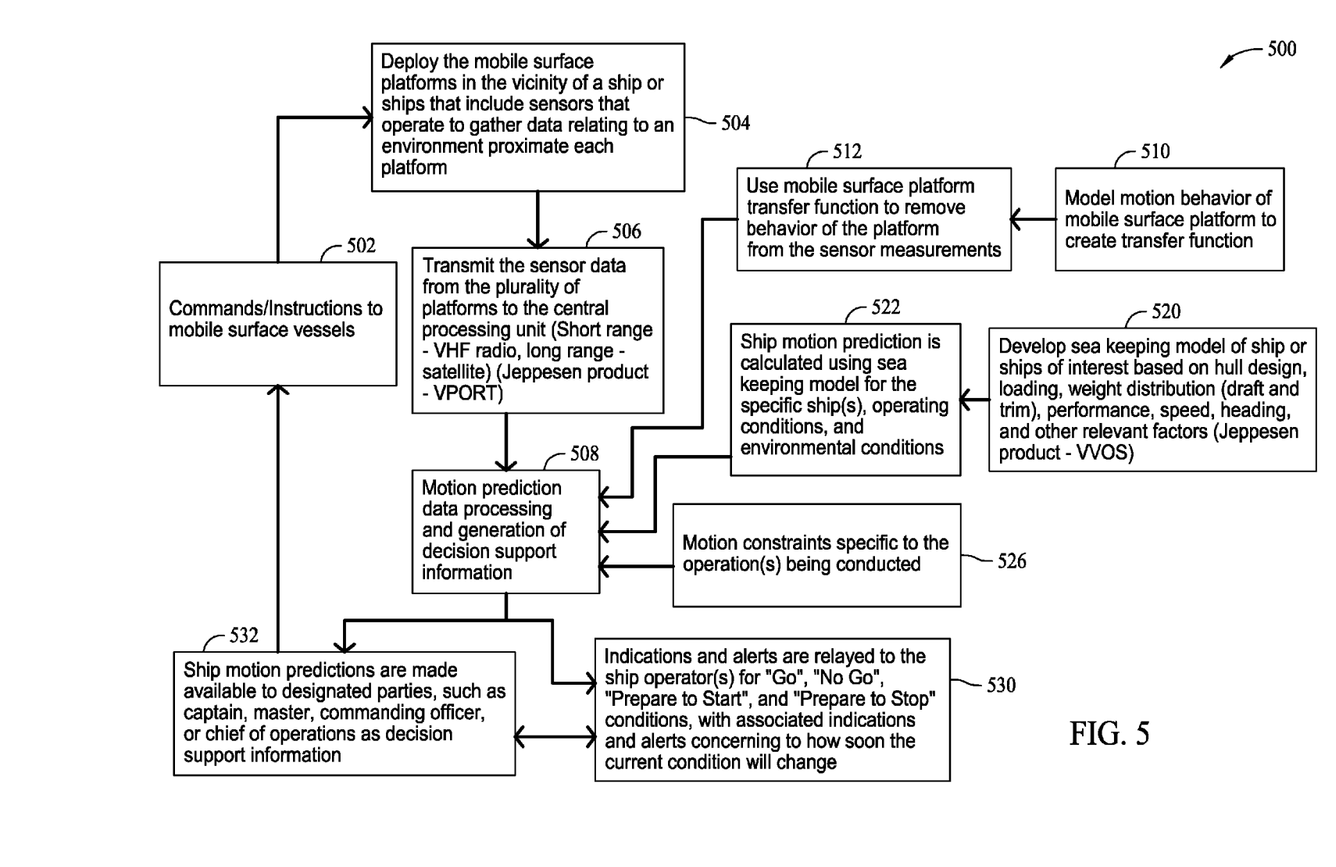
FIG. 5 is a flowchart providing further detail regarding the method of predicting ship motion.

FIG. 5 is a flowchart 500 providing further detail regarding the prediction of ship motion. Initially, commands and instructions are sent 502 and/or are programmed into to the plurality of mobile surface vessels. The mobile surface platforms are then deployed 504 in the vicinity of a ship or a plurality of ships. As described herein, the mobile surface platforms include sensors that operate to gather data relating to an environment proximate each platform (i.e., each mobile surface vessel). After deployment and upon attained the desired positioning, the sensor data gathered by each mobile surface platform is transmitted 506 to a central processing unit, sometimes referred to herein as a central computer. As mentioned herein, the transmission medium includes one or more of VHF, UHF, or Wi-Fi radio for short range transmissions and satellite transceiver for long range transmissions. Upon receipt, the central processing unit begins processing 508 the sensor data to predict timing, durations, and parameters of motions that will impact the ship or plurality of ships.

Other inputs form part of the processing 508 function. Particularly, and prior to deployment, a transfer function is created 510, based on a model of motion behavior for each specific type of mobile surface platforms. For example, each mobile surface platform includes a hull configuration that is a factor in the calculation and creation 510 of the transfer function. The transfer function is then used 512 to remove sea keeping characteristics of the mobile surface platform from the sensor data received by the central processing unit.

In addition, a sea keeping model is developed 520 for the ship or plurality of ships of interest. Such models are based on hull design, loading, weight distribution (draft and trim), performance, speed, heading and any other relevant factors. Using the developed 520 model, ship motion is predicted 522 for the specific ship, with other factors including any operating conditions and environmental conditions over and above the sensor data and data in the model.

Predicted ship motions may then be compared to predetermined motion constraints 526 of the specific operations being performed in order to determine if the operators should delay starting the operation, begin the operation, continue the operation, prepare to stop the operation, or immediately stop the operation.

Upon completion of such processing 508, indications and alerts are relayed 530 to ship operators in the form of "Go", "No Go", "Prepare to Start", and "Prepare to Stop" conditions. Instructions may further include indications and alerts directed to how soon the current conditions will change. In addition, ship motion predictions are made available 532 to designated parties, for example, a captain, a master, a commanding officer, or a chief of operations as decision support information.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A water vessel motion prediction system comprising:
   a plurality of surface platforms, said platforms each comprising:
      a propulsion system for movement of said platforms;
      a plurality of sensors operable for gathering sensor data relating to an environment proximate said platforms;
      a processing device communicatively coupled to said propulsion system and said plurality of sensors; and
      a transceiver communicatively coupled to said processing device; and
   a central computer comprising a communications interface, said processing device programmed to transmit the sensor data to said central computer via said transceiver and said communications interface, said central computer programmed to transmit commands for operation of said propulsion system to said processing device via said communications interface and said transceiver, said central computer further programmed to predict an effect the environment proximate said platforms has on a water vessel operating within a vicinity of said plurality of surface platforms, at least one of said processing device and said central computer further programmed to:

determine a future motion of the water vessel based at least in part on the gathered sensor data, a first hull configuration associated with at least one of said plurality of surface platforms, and a second hull configuration associated with the water vessel;

compare a predetermined motion constraint of a specific operation to the determined future motion of the water vessel: and determine at least one of a start, delayed start, continuation, preparation to stop, and immediate stop of the specific operation based on the comparison of the predetermined motion constraint of the specific operation to the determined future motion of the water vessel.

2. The water vessel motion prediction system according to claim 1 wherein said central computer is located at one of a shore-based facility, the water vessel, a remote water vessel, and one of said plurality of surface platforms.

3. The water vessel motion prediction system according to claim 1 wherein to predict the effect of the environment proximate said platforms on the water vessel, said central computer is programmed to utilize the sensor data from all of said plurality of surface platforms.

4. The water vessel motion prediction system according to claim 1 wherein said plurality of surface platforms are controlled from the water vessel.

5. The water vessel motion prediction system according to claim 1 wherein said plurality of surface platforms each comprise:
    a source of electrical power; and
    at least one device for recharging said source of electrical power.

6. The water vessel motion prediction system according to claim 1 wherein said plurality of surface platforms comprise at least one of remotely operable surface platforms, autonomously operable surface platforms, and manned surface platforms.

7. The water vessel motion prediction system according to claim 1 wherein said plurality of surface platforms are programmed to:
    A) move to a first location using said propulsion system;
    B) gather and transmit the sensor data associated with the first location; and
    C) move to a location different than the first location; and
    D) repeat steps B) and C) as programmed or as remotely controlled.

8. The water vessel motion prediction system according to claim 1 wherein said plurality of sensors comprises:
    at least one of inclinometers, rate gyroscopes, accelerometers, inertial reference units, and motion sensing devices;
    at least one of a global positioning system and an electronic compass;
    at least one of a radar, an AIS receiver and antenna, an echo sounder to determine water depth, a scanning sonar, a video camera, and proximity sensors.

9. The water vessel motion prediction system according to claim 1 wherein said transceiver comprises a wireless transceiver.

10. The water vessel motion prediction system according to claim 1 wherein said propulsion system is operable for at least one of positioning and station-keeping of said platforms.

11. A method for predicting water vessel motion comprising:
    deploying a plurality of surface platforms in a vicinity of a water vessel, each surface platform including a plurality of sensors operable for gathering sensor data relating to an environment proximate to at least one of the plurality of surface platforms;
    receiving the sensor data from the plurality of surface platforms;
    predicting, based on the sensor data, an effect the environment proximate to the at least one of said plurality of surface platforms has on the water vessel, wherein a future motion of the water vessel is determined based at least in part on the gathered sensor data, a first hull configuration associated with at least one of said plurality of surface platforms, and a second hull configuration associated with the water vessel;
    comparing a predetermined motion constraint of a specific operation to the determined future motion of the water vessel; and
    determining at least one of a start, delayed start, continuation, preparation to stop, and immediate stop of the specific operation based on the comparison of the predetermined motion constraint of the specific operation to the determined future motion of the water vessel.

12. The method according to claim 11 wherein receiving the sensor data comprises receiving wave height, wave direction, wave speed, current, wind, platform orientation, platform position, time and date.

13. The method according to claim 11 wherein receiving the sensor data from at least one of the plurality of surface platforms comprises receiving the sensor data from a plurality of remotely operable surface platforms having one or more of inclinometers, rate gyroscopes, accelerometers, motion sensing devices, a global positioning system, an electronic compass, a radar, an AIS receiver and antenna, an echo sounder, a forward scanning sonar, a video camera, and proximity sensors from the plurality of the surface platforms.

14. The method according to claim 11 wherein deploying the plurality of surface platforms in the vicinity of the water vessel comprises at least one of:
    deploying a plurality of autonomously operable surface platforms each programmed to move to a specific location for the gathering of the sensor data;
    deploying a plurality of remotely operable surface platforms and operating those platforms such that each move to the specific location for the gathering of the sensor data; and
    deploying a plurality of manned surface platforms and operating those platforms such that each move to the specific location for the gathering of the sensor data.

15. A water environment sensor device comprising:
    a platform operable in an aquatic environment;
    a propulsion system for movement of said platform within the aquatic environment;
    a plurality of sensors operable for gathering sensor data relating to conditions of the
    aquatic environment proximate said platform;
    a wireless transceiver; and a processing device communicatively coupled to said plurality of sensors and said wireless transceiver, said processing device programmed to:
receive the sensor data from said plurality of sensors, remove effects associated with said platform from the sensor data to generate processed sensor data;
transmit the processed sensor data to an external device via said wireless tansceiver:
determine a future motion of water vessel based at least in part on the processed sensor data and a hull configuration associated with the water vessel;
compare a predetermined motion constraint of a specific operation to the determined future motion of the water vessel; and
determine at least one of a start, delayed start, continuation, preparation to stop, and immediate stop of the specific operation based on the comparison of the predetermined motion constraint of the specific operation to the determined future motion of the water vessel.

16. The water environment sensor device according to claim 15 wherein said plurality of sensors comprises:
at least one of inclinometers, rate gyroscopes, accelerometers, inertial reference units, and motion sensing devices;
at least one of a global positioning system and an electronic compass; and
at least one of a radar, an AIS receiver and antenna, an echo sounder to determine water depth, a scanning sonar, a video camera, and proximity sensors.

17. The water environment sensor device according to claim 15 wherein said processing device is programmed with a model associated with said platform.

18. The water environment sensor device according to claim 15 wherein said propulsion system is at least one of:
remotely operable via said wireless transceiver and said processing device, said processing device communicatively coupled to said propulsion device;
autonomously operable via a program associated with said processing device, said processing device communicatively coupled to said propulsion device; and
manually operable with one or more persons deployed on said water environment sensor device.

19. The water environment sensor device according to claim 15 wherein said propulsion system is operable for at least one of positioning and station-keeping for said platform.

* * * * *